(12) United States Patent
Adolf et al.

(10) Patent No.: US 7,344,470 B2
(45) Date of Patent: Mar. 18, 2008

(54) MULTI-SPEED PLANETARY TRANSMISSION

(75) Inventors: Pierre Adolf, Erstein (FR); Cyrille Bridier, Strasbourg (FR); Matthieu Rihn, Lingolsheim (FR)

(73) Assignee: GM Global Technology Operations, Inc., Detroit, MI (US)

( * ) Notice: Subject to any disclaimer, the term of this patent is extended or adjusted under 35 U.S.C. 154(b) by 170 days.

(21) Appl. No.: 11/284,248

(22) Filed: Nov. 21, 2005

(65) Prior Publication Data

US 2007/0117673 A1 May 24, 2007

(51) Int. Cl.
*F16H 3/44* (2006.01)
(52) U.S. Cl. ...................... 475/269; 475/296
(58) Field of Classification Search ............... 475/269, 475/296
See application file for complete search history.

(56) References Cited

U.S. PATENT DOCUMENTS

| | | | |
|---|---|---|---|
| 5,106,352 A | 4/1992 | Leopelletier | |
| 5,133,697 A * | 7/1992 | Hattori | 475/276 |
| 6,802,795 B2 * | 10/2004 | Miyazaki et al. | 475/275 |
| 7,037,232 B2 * | 5/2006 | Ishimaru | 475/275 |
| 2005/0026739 A1 * | 2/2005 | Ishimaru | 475/277 |
| 2005/0037889 A1 * | 2/2005 | Hayabuchi et al. | 475/269 |
| 2005/0043134 A1 * | 2/2005 | Tabata et al. | 475/269 |
| 2006/0025275 A1 * | 2/2006 | Shim et al | 475/276 |
| 2007/0004551 A1 * | 1/2007 | Andres | 475/275 |
| 2007/0129201 A1 * | 6/2007 | Rihn et al. | 475/269 |

* cited by examiner

*Primary Examiner*—Sherry Estremsky

(57) ABSTRACT

A power transmission incorporates an input planetary gearset and an output planetary gearset, which are interconnected by a plurality of torque-transmitting mechanisms to establish at least seven forward speed ratios. The input planetary gearset has one member selectively connected with the input shaft and another member continuously connected with a stationary member. The output planetary gearset has one member continuously connected with the output shaft and a plurality of the members interconnected either with a stationary member through the torque-transmitting mechanisms or with the third member of the input planetary gearset to the torque-transmitting mechanisms, or with the input shaft through a torque-transmitting mechanism.

6 Claims, 6 Drawing Sheets

Example of available ratios

| Gear | Ratio | C1 | C2 | C3 | CB3 | CB1 | CB2 |
|---|---|---|---|---|---|---|---|
| Rev | -4.696 | | applied | | | applied | |
| 1 | 5.302 | applied | | | | applied | |
| 2 | 3.435 | applied | | | | | applied |
| 3 | 2.482 | applied | applied | | | | |
| 4 | 1.551 | applied | | applied | | | |
| 5 | 1.116 | applied | | | applied | | |
| 6 | 0.895 | | | applied | applied | | |
| 7 | 0.752 | | applied | applied | | | |

Optional 8th gear

| Gear | Ratio | C1 | C2 | C3 | CB3 | CB1 | CB2 |
|---|---|---|---|---|---|---|---|
| 8 | 0.498 | | | applied | | | applied |

| | spread 7RWD | spread added 8th gear |
|---|---|---|
| overall | 7.053 | 10.654 |
| 1 to 2 | 1.543 | 1.543 |
| 2 to 3 | 1.384 | 1.384 |
| 3 to 4 | 1.601 | 1.601 |
| 4 to 5 | 1.390 | 1.390 |
| 5 to 6 | 1.247 | 1.247 |
| 6 to 7 | 1.191 | 1.191 |
| 7 to 8 | | 1.511 |

RVS1 = 3.419
RVS2 = 3.507
RVS3 = 1.816

*FIG. 2*

Clutches 1,2,3,4,5 & 6

| Gear | B | C23 | C1 | C2 | C3 | CB3 | CB1 | CB2 |
|---|---|---|---|---|---|---|---|---|
| Rev | x | | | x | | | | |
| 1 | x | | | | | | x | |
| 2 | | x | x | | | | x | |
| 3 | | x | x | | | | x | |
| 4 | x | | x | x | | | | x |
| 5 | x | | x | | | | | |
| 6 | x | | | x | | | | |
| 7 | x | | | | x | | | |
| optional 8 | x | | | | x | x | | x |

*FIG. 5*

| Gear | Ratio |
|---|---|
| 1 | 5.302 |
| 2 | 3.419 |
| 3 | 2.215 |
| 4 | 1.551 |
| 5 | 1.116 |
| 6 | 0.895 |
| 7 | 0.752 |
| Rev | -4.696 |

| Gear | Ratio |
|---|---|
| 8 | 0.498 |

|  | spread 7RWD | spread added 8th gear |
|---|---|---|
| overall | 7.053 | 10.654 |
| 1 to 2 | 1.551 | 1.551 |
| 2 to 3 | 1.543 | 1.543 |
| 3 to 4 | 1.429 | 1.429 |
| 4 to 5 | 1.390 | 1.390 |
| 5 to 6 | 1.247 | 1.247 |
| 6 to 7 | 1.191 | 1.191 |
| 7 to 8 |  | 1.511 |

RVS1 = 3.30
RVS2 = 2.40
RVS3 = 1.816

*FIG. 6*

| Gear | Ratio |
|---|---|
| 1 | 5.148 |
| 2 | 3.300 |
| 3 | 2.200 |
| 4 | 1.560 |
| 5 | 1.122 |
| 6 | 0.860 |
| 7 | 0.688 |
| Rev | -3.432 |

| Gear | Ratio |
|---|---|
| 8 | 0.478 |

|  | spread 7RWD | spread added 8th gear |
|---|---|---|
| overall | 7.488 | 10.764 |
| 1 to 2 | 1.560 | 1.560 |
| 2 to 3 | 1.500 | 1.500 |
| 3 to 4 | 1.410 | 1.410 |
| 4 to 5 | 1.390 | 1.390 |
| 5 to 6 | 1.305 | 1.305 |
| 6 to 7 | 1.251 | 1.251 |
| 7 to 8 |  | 1.438 |

RVS1 = 3.30
RVS2 = 2.40
RVS3 = 1.786

*FIG. 7*

MULTI-SPEED PLANETARY TRANSMISSION

TECHNICAL FIELD

This invention relates to power transmissions and, more particularly, to multi-speed planetary-type power transmissions.

BACKGROUND OF THE INVENTION

Planetary power transmissions are used in both passenger vehicle and commercial vehicle applications. The powertrain in these vehicles generally includes an engine, a multi-speed transmission, and an output mechanism or differential.

The passenger vehicle of the past generally used a countershaft or synchronous-type transmission for providing the various speeds between the input and the output. Currently, both countershaft-type transmissions and planetary-type transmissions are employed in vehicle powertrains. In planetary-type transmissions, two or more planetary gearsets are controlled by a plurality of torque-transmitting mechanisms, commonly termed clutches and brakes to establish a plurality of speed ratios between a transmission input and a transmission output.

The planetary transmissions began as two-speed transmissions and developed into three-speed, four-speed, and five-speed type transmissions. Currently, there are a number of five-speed transmission units which are well known to the public, and also six-speed transmission units. One particular six-speed transmission is seen in U.S. Pat. No. 5,106,352 issued to Lepelletier on Apr. 21, 1992. The Lepelletier transmission incorporates an input gear mechanism or ratio-controlled set and an output planetary gearset, which provides a plurality of speed ratios. The Lepelletier concept employs five torque-transmitting mechanisms in the form of three rotating-type or clutches and two stationary-type or brakes.

It has become desirable more recently to incorporate six forward speed ratios in the planetary transmission thereby improving the overall performance and economy of the passenger vehicle.

SUMMARY OF THE INVENTION

It is an object of the present invention to provide an improved powertrain incorporating a multi-speed planetary transmission.

In one aspect of the present invention, the planetary transmission provides seven forward speed ratios and one reverse speed ratio.

In another aspect of the present invention, the planetary transmission provides eight forward speed ratios and one reverse speed ratio.

In yet another aspect of the present invention, the planetary transmission incorporates an input planetary gearset and an output planetary gearset wherein the two planetary gearsets are interconnected through a plurality of torque-transmitting mechanisms.

In still another aspect of the present invention, the input planetary gearset is a simple planetary gearset providing a reduction speed input.

In a further aspect of the present invention, the output planetary gearset is a compound planetary gearset, which has at least one member continuously connected with the output shaft and at least two members selectively connectable with the input planetary gearset.

In a yet further aspect of the present invention, the output planetary gearset has at least one member connectible with the input shaft for the transmission, which is also connected with the input planetary gearset.

In a still further aspect of the present invention, the output planetary gearset incorporates two sun gears, two ring gears, and a compound planet carrier assembly having at least two short pinions and one long pinion.

In a yet still further aspect of the present invention, the long pinion of the output planetary gearset is continuously meshing between one sun gear and one ring and the other sun gear is operatively connected with the long pinion through a short pinion, and the other ring gear is connected with the long pinion through a short pinion.

DESCRIPTION OF THE DRAWINGS

FIG. 2 is a plurality of charts showing the engagement schedule for the torque-transmitting mechanisms of FIG. 1 as well as ratios that are provided by the transmission shown in FIG. 1 and the spread between the ratios of the transmission shown in FIG. 1.

FIG. 5 is a chart showing the engagement schedule for the torque transmitting mechanisms of the transmission shown in FIG. 4

FIG. 6 is a chart of an alternative ratios and ratio spreads that can be provided by the transmission shown in FIG. 4.

FIG. 7 is a chart similar to FIG. 6 describing another series of alternative ratios and ratio spreads.

DESCRIPTION OF EXEMPLARY EMBODIMENTS

Figure 1:
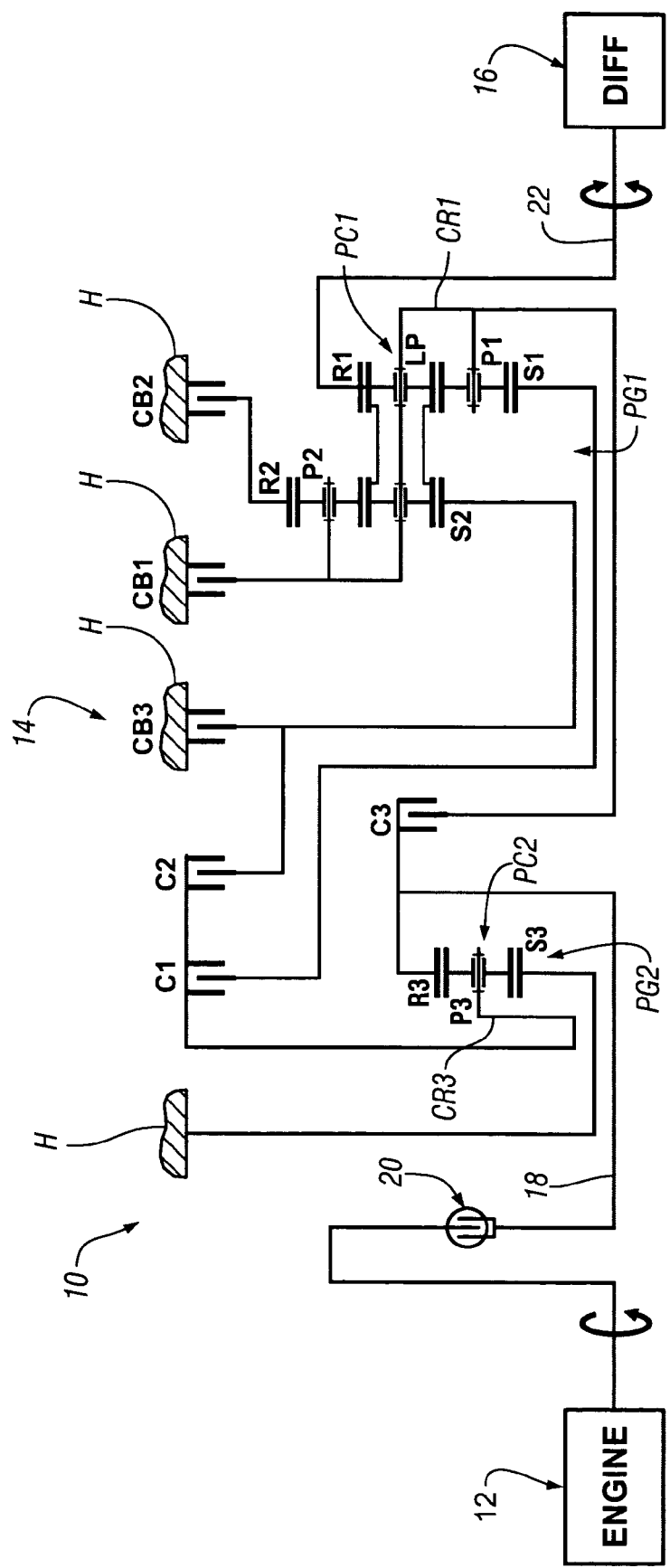
FIG. 1 is a schematic representation of a vehicle powertrain incorporating the present invention.

Referring to the drawings, wherein like characters represent the same or corresponding parts throughout the several views, there is seen in FIG. 1 a powertrain generally designated 10, which includes an engine 12, a planetary transmission 14, and an output or final drive mechanism 16, such as a differential. The engine 12 continuously drives an input shaft 18 through a conventional vibration damper assembly 20. The engine 12 and input shaft 18 may also be selectively connectable through a conventional clutch or a hydrodynamic drive apparatus.

The planetary transmission 14 has an output planetary gearset designated PG1 and an input planetary gearset designated PG2. The planetary transmission 14 also incorporates a plurality of torque-transmitting mechanisms C1, C2, and C3, each of which are rotating-type torque-transmitting mechanisms or clutches, and CB1, and CB2, and CB3, each of which are stationary-type torque-transmitting mechanisms commonly termed brakes or reaction clutches.

The planetary gearset PG1 incorporates two sun gear members S1, S2, two ring gear members R1, R2, and a planet carrier assembly PC1. The planet carrier assembly PC1 includes a planet carrier CR1, which rotatably mounts a plurality of pinion gears P1 meshing with the sun gear member S1, a second plurality of pinion gears P2 meshing with the ring gear member R2, and a plurality of long pinion gears LP meshing with the pinion P1 and the ring gear R1 as well as with the sun gear member S2 and the pinion gear P2. The planetary gearset PG1 is a compound double planetary gearset constructed in the fashion of a Ravigneaux-type gearset. The ring gear member R1 is continuously connected with a transmission output shaft 22.

The planetary gearset PG2, which is an input planetary gearset, has a sun gear member S3, a planet carrier assembly PC2, and a ring gear member R3. The planet carrier assembly PC2 includes a plurality of pinion gears P3 rotatably mounted on a planet carrier CR3. The ring gear member R3 is continuously connected with the input shaft 18 and is selectively connectible with the planet carrier member CR1 through the torque-transmitting mechanism C3. The sun gear member S3 is continuously connected with a transmission housing or stationary member H. The planet carrier CR3 is connectible with the torque-transmitting mechanisms C1 and C2.

The torque-transmitting mechanism C1 is connectible with the sun gear member S1 and when engaged connects the planet carrier CR3 with the sun gear member S1. The torque-transmitting mechanism C2 is selectively engageable to connect between the planet carrier CR3 and the sun gear member S2. The torque-transmitting mechanism C3, as previously mentioned, is selectively engageable to connect between the input shaft 18 and the ring gear member R3 with the planet carrier CR1. The torque-transmitting mechanism CB1 is selectively engageable to connect the planet carrier CR1 with the stationary member H. The torque-transmitting mechanism CB2 is selectively engageable to connect the ring gear member R2 with the stationary member H. The torque-transmitting mechanism CB3 is selectively engageable to connect the sun gear member S2 to the stationary member H.

As seen in the engagement schedule chart of FIG. 2, the torque-transmitting mechanisms are engageable in combinations of two to establish seven forward speed ratios between the input shaft 18 and the output shaft 22. Also shown in FIG. 2 is an eighth forward speed ratio, which can be established within the planetary transmission 14. FIG. 2 also provides the ring gear/sun gear tooth ratios of the planetary gearsets PG1 and PG2 and the ratio spreads that are accomplished using these ring gear/sun gear tooth ratios in the seven-speed transmission as well as the eight-speed transmission.

The ratio numbers shown with the clutch engagement schedule and the ratio spread numbers as well as the ring gear/sun gear ratios are variables that are established by the transmission designer to provide the overall performance of the transmission when coupled with a particular engine. It should be noted that these numbers are not definitive of the present invention, however, are shown by way of example as to what can be accomplished with the present invention.

Figure 3:
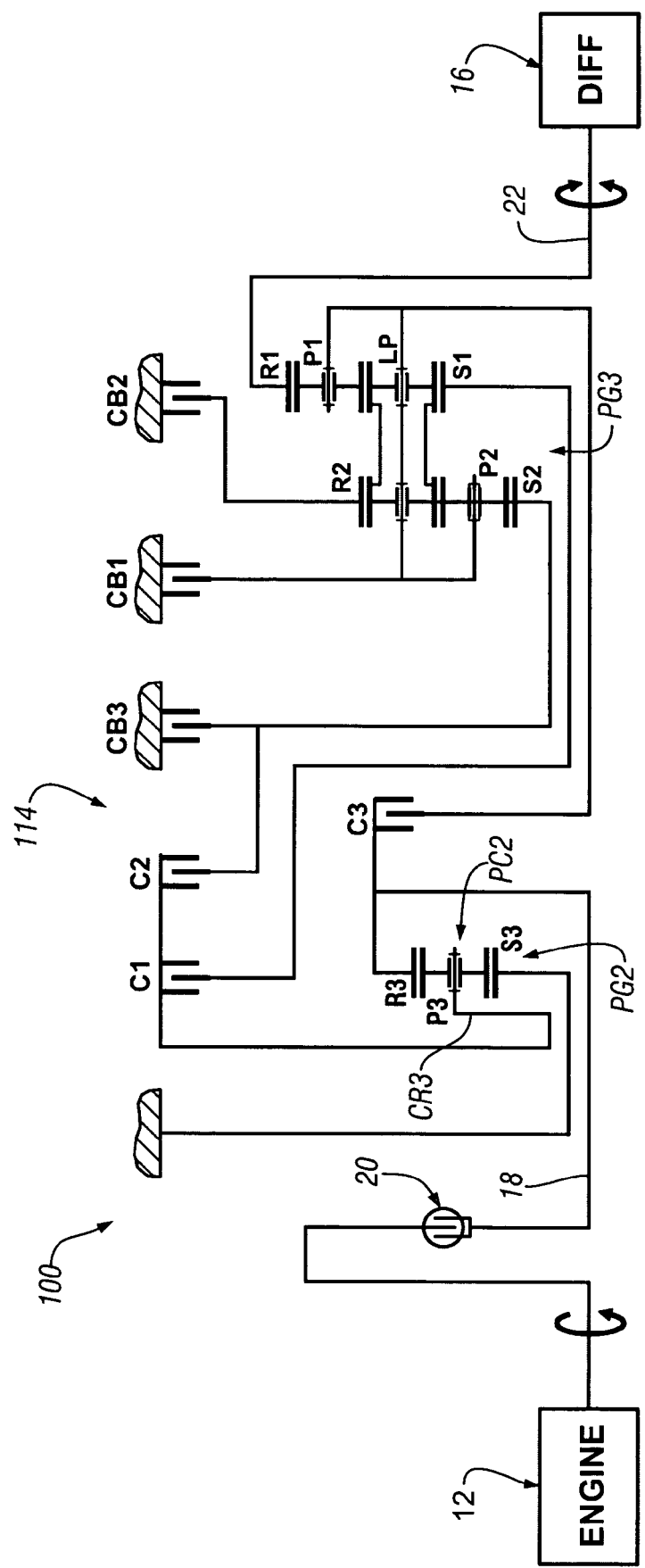
FIG. 3 is a schematic representation of a vehicle powertrain incorporating another embodiment of the present invention.

FIG. 3 depicts a powertrain 100 similar to the powertrain 10 shown in FIG. 1 and incorporates the engine 12, a planetary transmission 114, the output shaft 22, and the final drive mechanism or differential 16. The planetary transmission 114 also has the input shaft 18 and the conventional vibration damper 20.

The main difference between FIGS. 1 and 3 is seen in PG3. PG3 has the same number of components as PG1; however, they are arranged slightly different. The long pinion LP of PG3 is meshed between the sun gear member S1 and the ring gear member R2, while the short pinion P2 is meshed between the sun gear member S2 and the long pinion LP, and the short pinion P1 is meshed between the ring gear member R1 and the long pinion LP. The other components of the transmission are identical.

The transmission shown in FIG. 3 will utilize the same engagement schedule as that shown in FIG. 2 for the powertrain of FIG. 1. This powertrain 100 will provide seven forward speed ratios and an optional eighth speed ratio, if desired. It should be noted that there are no additional gear members or torque-transmitting mechanisms required between the use of a seven-speed transmission and an eight-speed transmission.

It will be noted that in the seven-speed transmission, the stationary torque-transmitting mechanism CB2 is used only in the second forward speed ratio. This torque-transmitting mechanism is also used in the optional eight forward speed ratio. Therefore, the torque-transmitting mechanism CB2 is reused to determine the eight-speed ratio, as is the rotating torque-transmitting mechanism C3.

Figure 4:
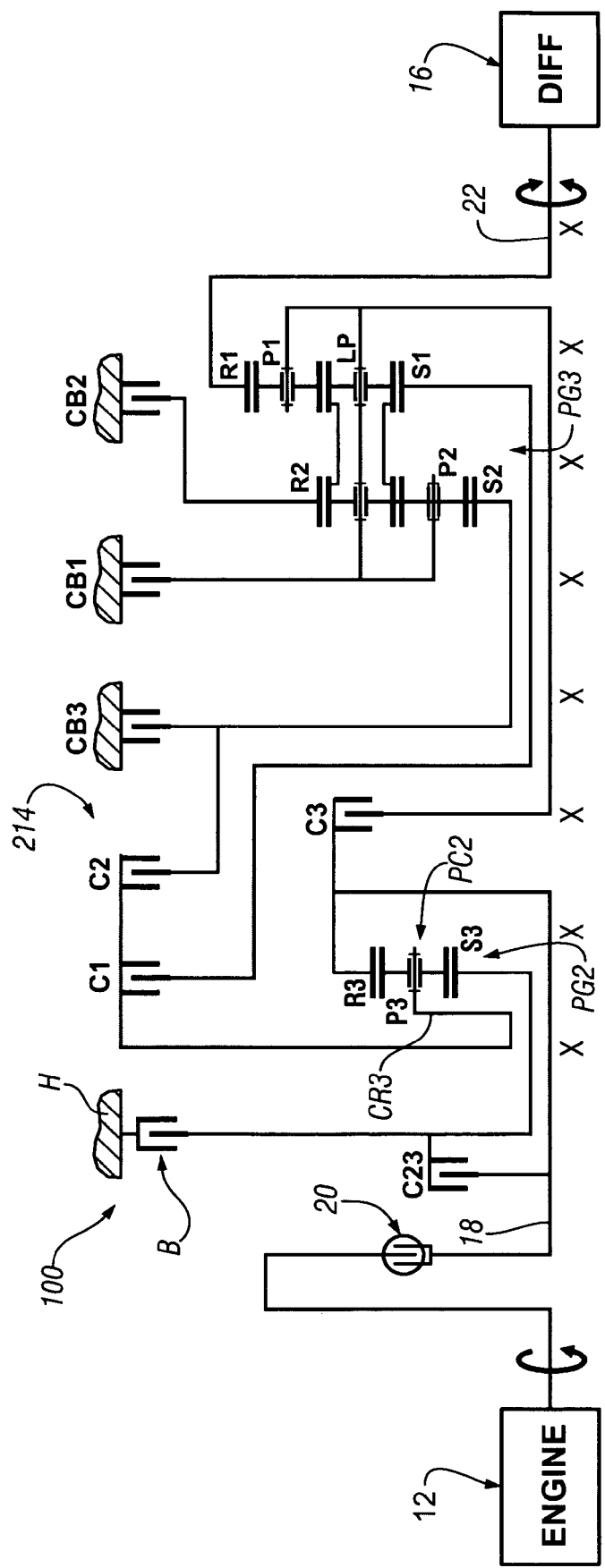
FIG. 4 is a schematic representation of a vehicle powertrain incorporating another embodiment of the present invention.

The powertrain 200 shown in FIG. 4 includes a planetary transmission 214 that has the same gearing scheme and torque transmitting mechanisms as the transmission 14 shown in FIG. 1. However, the Planetary transmission 214 has two additional torque transmitting mechanisms C23 and B, disposed to control the ratio of the input planetary gearset PG2. The torque-transmitting mechanism B establishes the sun gear S3 as a reaction member and the torque-transmitting mechanism C23 establishes a direct ratio in the planetary gearset PG2.

The chart shown in FIG. 5 describes the engagement schedule for the planetary transmission 214. The torque-transmitting mechanism B is engaged for reverse and all forward speed ratios except second and third. During second and third ratios, the torque-transmitting mechanism C23 is engaged. From the chart of FIG. 5 it will be evident to those skilled in the art that the planetary gearset PG2 provides two input speeds to the planetary gearset PG1. A reduced speed at the torque transmitting mechanisms C1, C2, and C3 when the torque-transmitting mechanism B is engaged and a direct engine input when the torque-transmitting mechanism C23 is engaged. As with the planetary transmission 14 (FIG. 1), an eigth forward ratio can be established. The additional torque transmitting mechanisms C23 and B permit additional flexibility for the planetary transmission 214.

FIG. 6 describes a transmission having ring gear/sun gear tooth ratios which will provide a series of forward ratios (1$^{st}$ to 7$^{th}$) having an optimal decreasing step ratio between adjacent forward ratios and an overall spread of 7.0. FIG. 7 describes alternative ring gear/sun gear tooth ratios with the R3/S3 tooth ratio changed from 1.816 to 1.786. This arrangement also provides a decreasing step ratio between adjacent forward ratios (1$^{st}$ to 7$^{th}$) and produces an overall spread of 7.5. The above-described transmissions and the ratios provided are useful in automotive vehicles and trucks. The high first forward and reverse ratios permit operation without the use of a conventional torque converter.

The invention claimed is:
1. A multi-speed power transmission comprising:
an input shaft;
an output shaft;
an input planetary gearset having first, second, and third members with said first member including means for connection with a stationary housing and said second member continuously connected with said input shaft;
an output planetary gearset having first, second, third, fourth, and fifth members, said third member comprising a planet carrier assembly having rotatably mounted thereon a plurality of pinion gears wherein a first and second of said pinion gears mesh between said first member and said second member and said first and a third of said pinion gears mesh between said fourth member and said fifth member, said second member being continuously connected with said output shaft;

wherein said first member of said output planetary gearset is a sun gear, said second member is a ring gear, said fourth member is a sun gear, and said fifth member is a ring gear, and said first pinion gear is a long pinion meshing with said first member and said fifth member; and six selectively operable torque-transmitting mechanisms selectively operable among said planetary gear members to establish at least seven forward speed ratios and one reverse speed ratio between said input shaft and said output shaft wherein:

the second and fifth of said torque transmitting mechanisms are selectively engaged to provide the reverse ratio;

the first and fifth of said torque transmitting mechanisms are selectively engaged to provide the first forward ratio;

the first and sixth of said torque transmitting mechanisms are selectively engaged to provide the second forward ratio;

the first and fourth of said torque transmitting mechanisms are selectively engaged to provide the third forward ratio;

the first and second of said torque transmitting mechanisms are selectively engaged to provide the fourth forward ratio;

the first and third of said torque transmitting mechanisms are selectively engaged to provide the fifth forward ratio;

the second and third of said torque transmitting mechanisms are selectively engaged to provide said sixth forward ratio; and the third and fourth of said torque transmitting mechanisms are selectively engaged to provide said seventh forward ratio.

2. The multi-speed power transmission defined in claim 1, further wherein:

said first member of said output planetary gearset is a sun gear, said second member is a ring gear, said fourth member is a sun gear, and said fifth member is a ring gear, and said first planet pinion being a long pinion meshing between said fourth member and said second member.

3. The multi-speed power transmission defined in claim 1, further wherein:

said torque transmitting mechanisms are selectively engaged to provide eight forward speed ratios with said third torque-transmitting mechanism and said sixth torque-transmitting mechanism being selectively engaged to provide said eighth forward speed ratio.

4. The multi-speed power transmission defined in claim 1, further wherein:

a tooth ratio between said second and first members of said input planetary gearset is 1.816;

a tooth ratio between said second and first members of said output planetary gearset is 3.30;

a tooth ratio between said fifth and fourth member of said output planetary gear set is 2.40; and step ratios between adjacent one of the first through seventh forward speed ratios decrease in value.

5. The multi-speed power transmission defined in claim 1, further wherein:

a tooth ratio between said second and first members of said input planetary gearset is 1.786;

a tooth ratio between said second and first members of said output planetary gearset is 3.30;

a tooth ratio between said fifth and fourth member of said output planetary gear set is 2.40; and step ratios between adjacent one of the first through seventh forward speed ratios decrease in value.

6. A multi-speed power transmission comprising:

an input shaft;

an output shaft;

an input planetary gearset having first, second, and third members with said first member including means for connection with a stationary housing and said second member continuously connected with said input shaft;

an output planetary gearset having first, second, third, fourth, and fifth members, said third member comprising a planet carrier assembly having rotatably mounted thereon a plurality of pinion gears wherein a first and second of said pinion gears mesh between said first member and said second member and said first and a third of said pinion gears mesh between said fourth member and said fifth member, said second member being continuously connected with said output shaft; and six selectively operable torque-transmitting mechanisms selectively operable among said planetary gear members to establish at least seven forward speed ratios and one reverse speed ratio between said input shaft and said output shaft wherein:

the second and fifth of said torque transmitting mechanisms are selectively engaged to provide the reverse ratio;

the first and fifth of said torque transmitting mechanisms are selectively engaged to provide the first forward ratio;

the first and sixth of said torque transmitting mechanisms are selectively engaged to provide the second forward ratio;

the first and fourth of said torque transmitting mechanisms are selectively engaged to provide the third forward ratio;

the first and second of said torque transmitting mechanisms are selectively engaged to provide the fourth forward ratio;

the first and third of said torque transmitting mechanisms are selectively engaged to provide the fifth forward ratio;

the second and third of said torque transmitting mechanisms are selectively engaged to provide said sixth forward ratio;

the third and fourth of said torque transmitting mechanisms are selectively engaged to provide said seventh forward ratio; and further wherein:

said first member of said input planetary gear set is selectively connected with the stationary housing by a selectively engageable brake torque-transmitting mechanism during at least five forward ratios and said reverse ratio:

said first member of said input planetary gear set is selectively connected with said input shaft by a selectively engageable clutch torque-transmitting mechanism during at least two forward ratios; and said six torque transmitting mechanisms, said brake torque-transmitting mechanism and said clutch torque-transmitting mechanism wherein:

said brake torque-transmitting mechanism, said second torque-transmitting mechanism and said fifth torque-transmitting mechanism are engaged during said reverse ratio;

said brake torque-transmitting mechanism, said first torque-transmitting mechanism, and said fifth torque-transmitting mechanism are engaged during said first forward ratio;

said clutch torque-transmitting mechanism, said first torque-transmitting mechanism, and said fifth torque-transmitting mechanism are engaged during said second forward ratio;

said clutch torque-transmitting mechanism, said first torque-transmitting mechanism, and said sixth torque-transmitting mechanism are engaged during said third forward ratio;

said brake torque-transmitting mechanism is engaged during each of the fourth through seventh forward ratios;

said first and second torque transmitting mechanisms are engaged during said fourth forward ratio, said first and third torque transmitting mechanisms are engaged during said fifth forward ratio, said second and third torque transmitting mechanisms are engaged during said sixth forward ratio, and said third and fourth torque transmitting mechanisms are engaged during said seventh forward ratio.

* * * * *